2 Sheets—Sheet 1.

G. W. BROWN.

SEED PLANTER.

No. 10,294. Reissued Mar. 13, 1883.

*WITNESSES*

Fred. G. Dieterich.
P. C. Dieterich.

*By his Attorney*

*INVENTOR*

George W. Brown
W. B. Richards

N. PETERS. Photo-Lithographer, Washington, D. C.

2 Sheets—Sheet 2.

G. W. BROWN.

SEED PLANTER.

No. 10,294. Reissued Mar. 13, 1883.

WITNESSES

Fred. G. Dieterich

P. C. Dieterich

By his Attorney

INVENTOR

George W. Brown

W. B. Richards

N. PETERS, Photo-Lithographer, Washington, D. C.

UNITED STATES PATENT OFFICE.

GEORGE W. BROWN, OF GALESBURG, ILLINOIS.

SEED-PLANTER.

SPECIFICATION forming part of Reissued Letters Patent No. 10,294, dated March 13, 1883.

Original No. 99,286, dated February 1, 1870. Reissue No. 6,757, dated November 23, 1875. Application for reissue filed April 26, 1881.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the invention, that will enable others skilled in the art to which it appertains to make and use the same, reference being had to the accompanying drawings, and to the letters of reference marked thereon, which form a part of this specification, in which—

Figure 1:
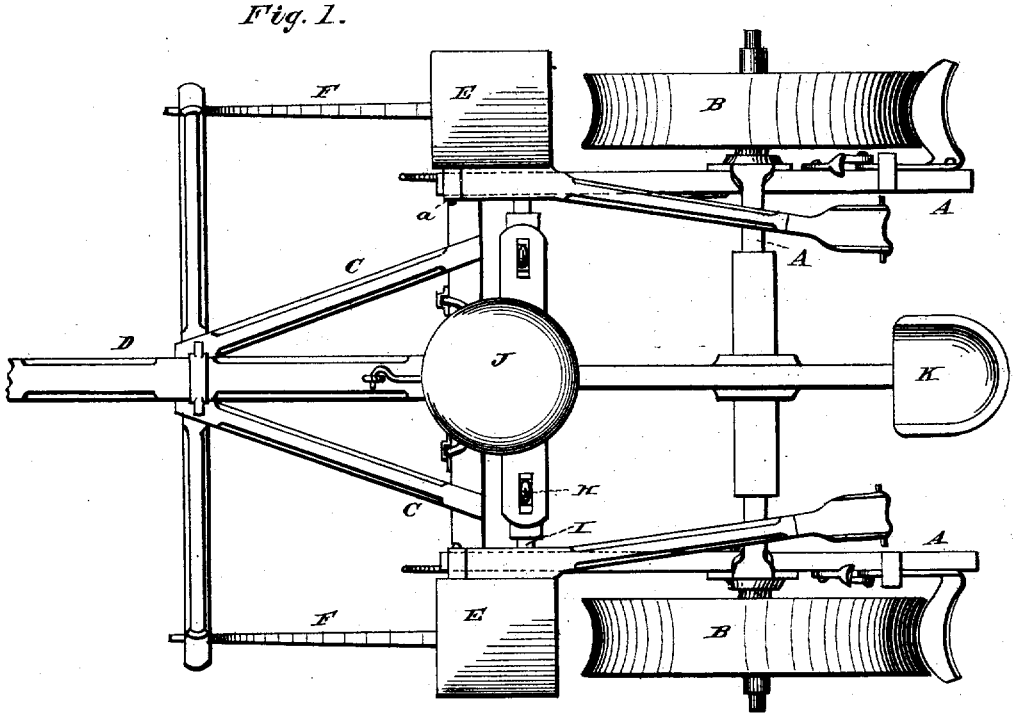
Figure 2:
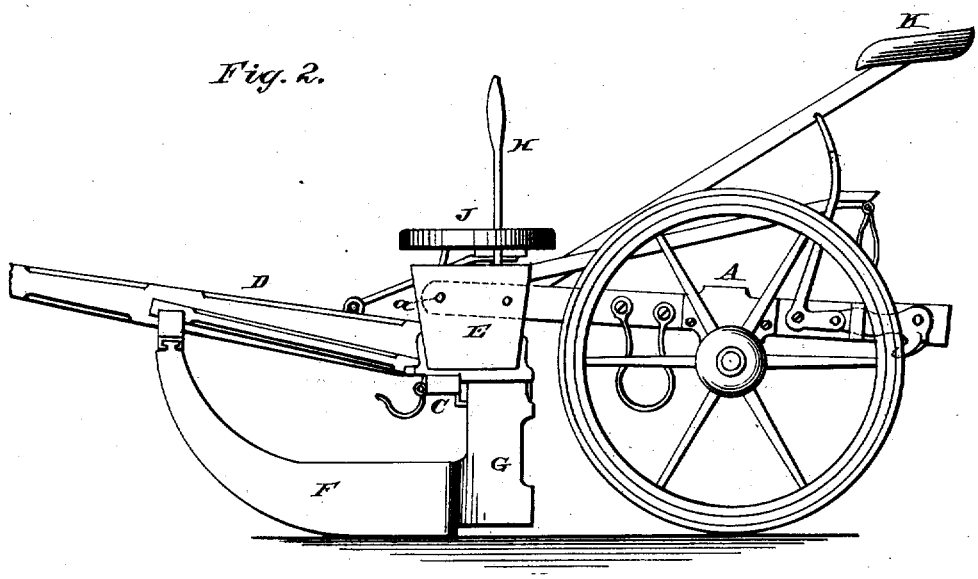
Figure 3:
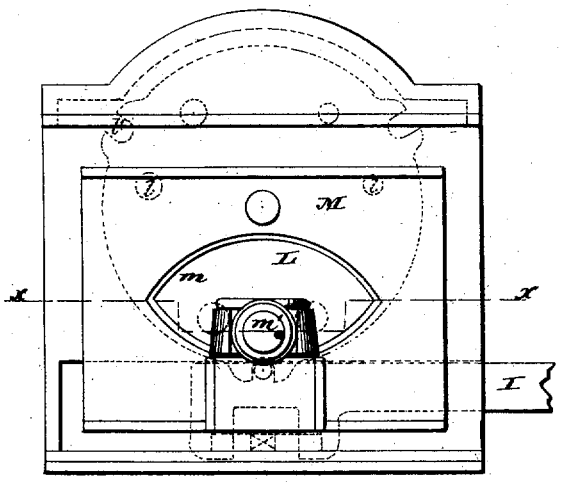
Figure 6:
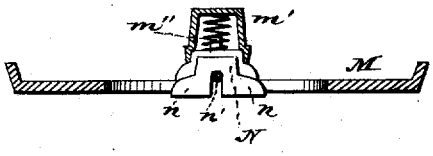
Figure 4:
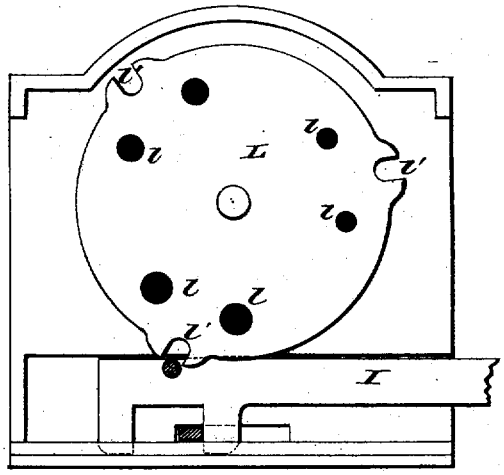
Figure 7:
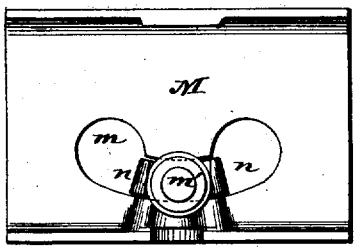
Figure 5:
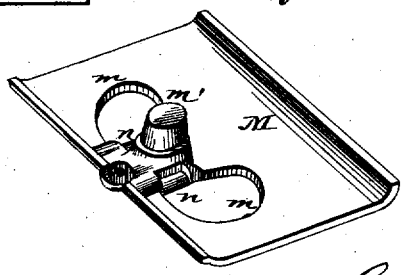

Figure 1 is a top plan of a machine embodying my invention. Fig. 2 is a side elevation. Fig. 3 is a top plan of the bottom of the seed-hopper. Fig. 4 is the same plan as Fig. 3, except that the cap for the seed-cup plate is removed. Fig. 5 is a perspective of the cap-plate for the seed-cup plate. Fig. 6 is a sectional elevation of the seed-plate, showing the yielding cut-off. Fig. 7 is a top plan of Fig. 5.

This invention relates to that class of corn-planters in which the seed cups or chambers in the slide pass beneath cut-offs for the purpose of separating the charge of seed from its fellows in the seed-hopper for delivery to the seed tube or conductor to the place of deposit in the soil; and it consists in the use of a yielding cut-off, constructed and arranged to yield upward at either end, or upward bodily, or at both ends at the same time, all as hereinafter fully described.

This invention is designed to be an improvement upon other inventions which I have made and patented.

Referring to the drawings by letters, A represents the parts of the rear main frame, supported on wheels B B.

C represents the forward frame, hinged to the rear frame, A, at *a*, and carrying the tongue D, and hoppers E E, and runners or furrow-openers F F, and seed-tubes G.

H is the hand-lever, by which the attendant gives the necessary reciprocating motion to the cross-bar or connecting-rod I to operate the seed-cup plates.

J is the attendant's seat, and K is the driver's seat.

L is the seed-cup plate, having seed-cups in pairs, *b b*, each pair of different capacity, and may be adjusted or attached in position to drop through either pair of seed-chambers *b b*. It is given the necessary vibrating motion by a projection from the rod I, which engages with one of the recesses *l* in its outer edge.

M is a cap entirely covering the seed-cup plate except an arc-shaped aperture, *m*, over the path of the seed-cups when vibrating. Centrally over the opening *m* is an arch or cap, *m'*, hollow from its under side.

N is the yielding cut-off, made so by the coil-spring *m''*, the coil-spring being placed within the cap *m'*. A rubber spring could be used instead of the coil-spring. As shown in the drawings, this yielding cut-off consists of two ends, slightly beveled or rounding on their upper sides, with a slight projection extending upward into the cap *m'*, over which projection is placed the coil-spring *m''*, which is arranged to exert a continuous downward pressure upon the cut-off. (See Fig. 6.) As also shown, a pin, *n'*, extends across the opening *m* and rests in a transverse slot across the center and bottom of the cut-off N, so as not to interfere with its movements, but to prevent displacement of the spring and cut-off and permit of its oscillating slightly. This cut-off being yielding, as the seed-cup plate L is vibrated by means of the cross-bar I, alternately bringing the seed-cups *b b* under the cut-off, carrying seed to be dropped, no seed can be injured, as the cut-off, being yielding, does not afford sufficient resistance between the cut-off and the seed-cup plate to injure the seed.

What I claim as new, and desire to secure by Letters Patent, is—

The yielding cut-off N, when made and arranged to operate substantially in the manner shown and described.

In testimony whereof I affix my signature in presence of two witnesses.

GEORGE W. BROWN.

Witnesses:
JAMES E. BROWN,
I. S. PERKINS.